May 13, 1941.  R. COVER  2,242,113
MACHINE FOR DEBUTTING CORN
Filed Jan. 22, 1938   11 Sheets-Sheet 9

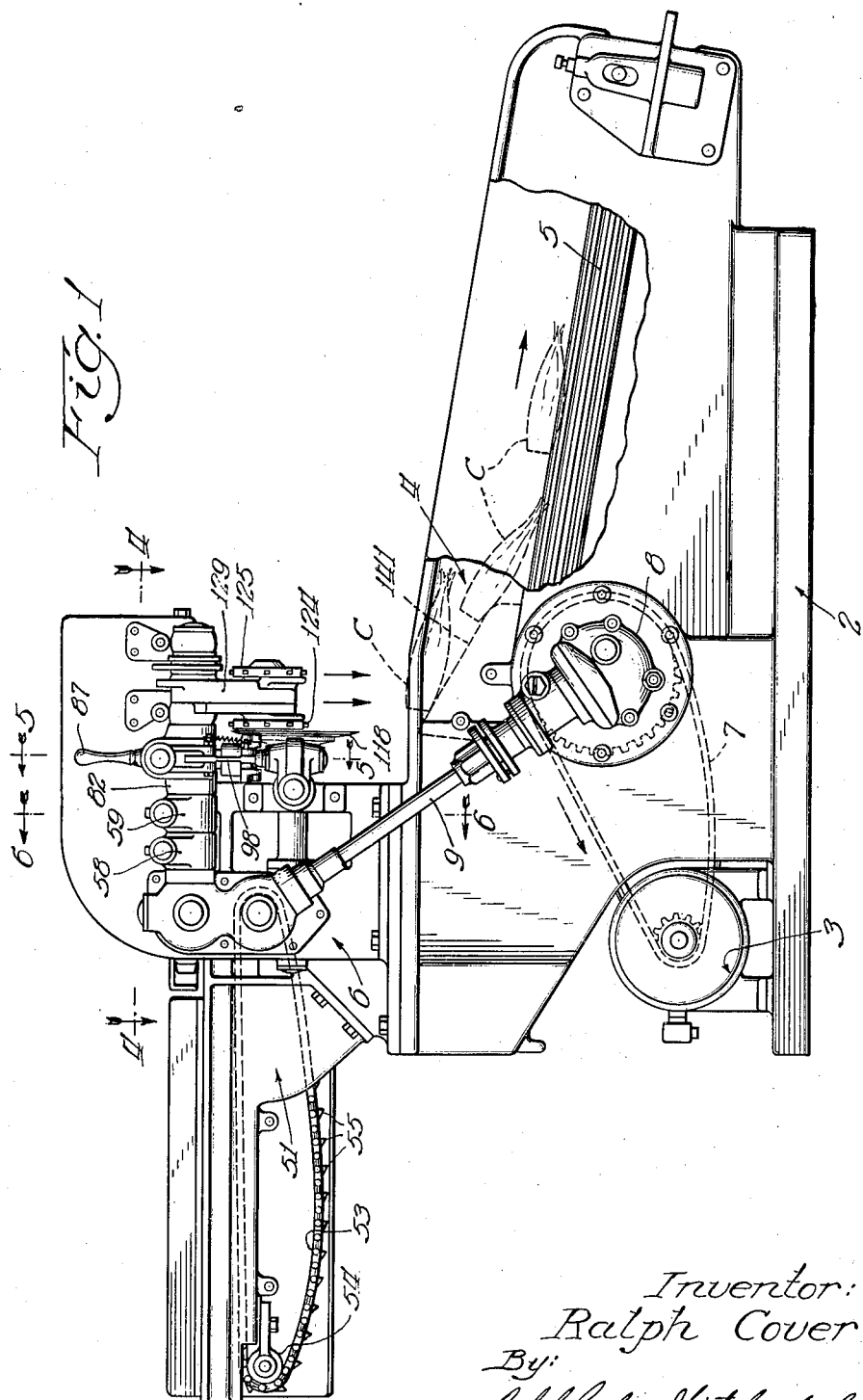

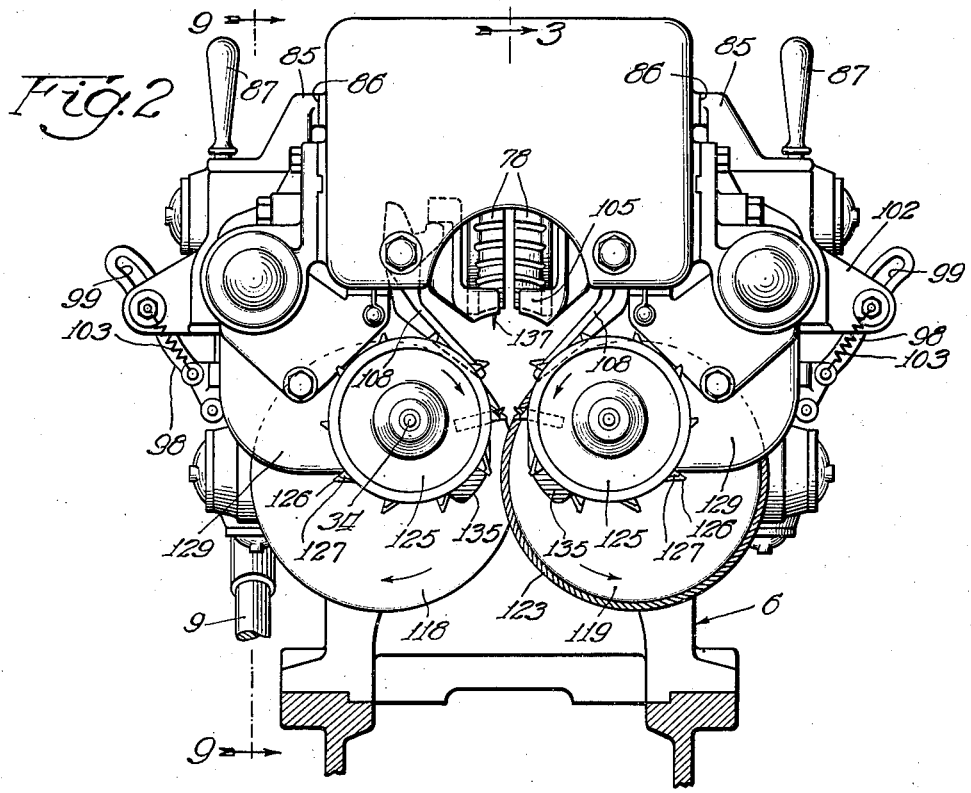
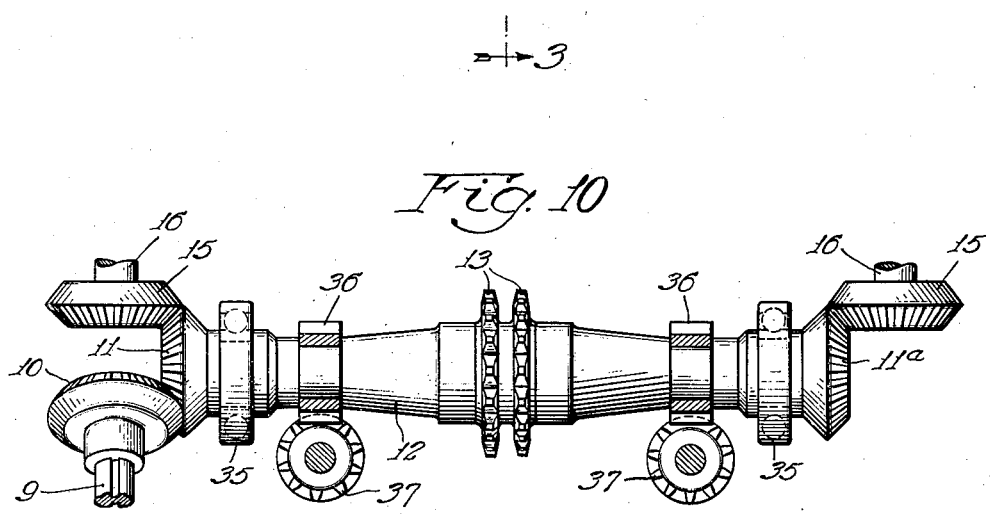

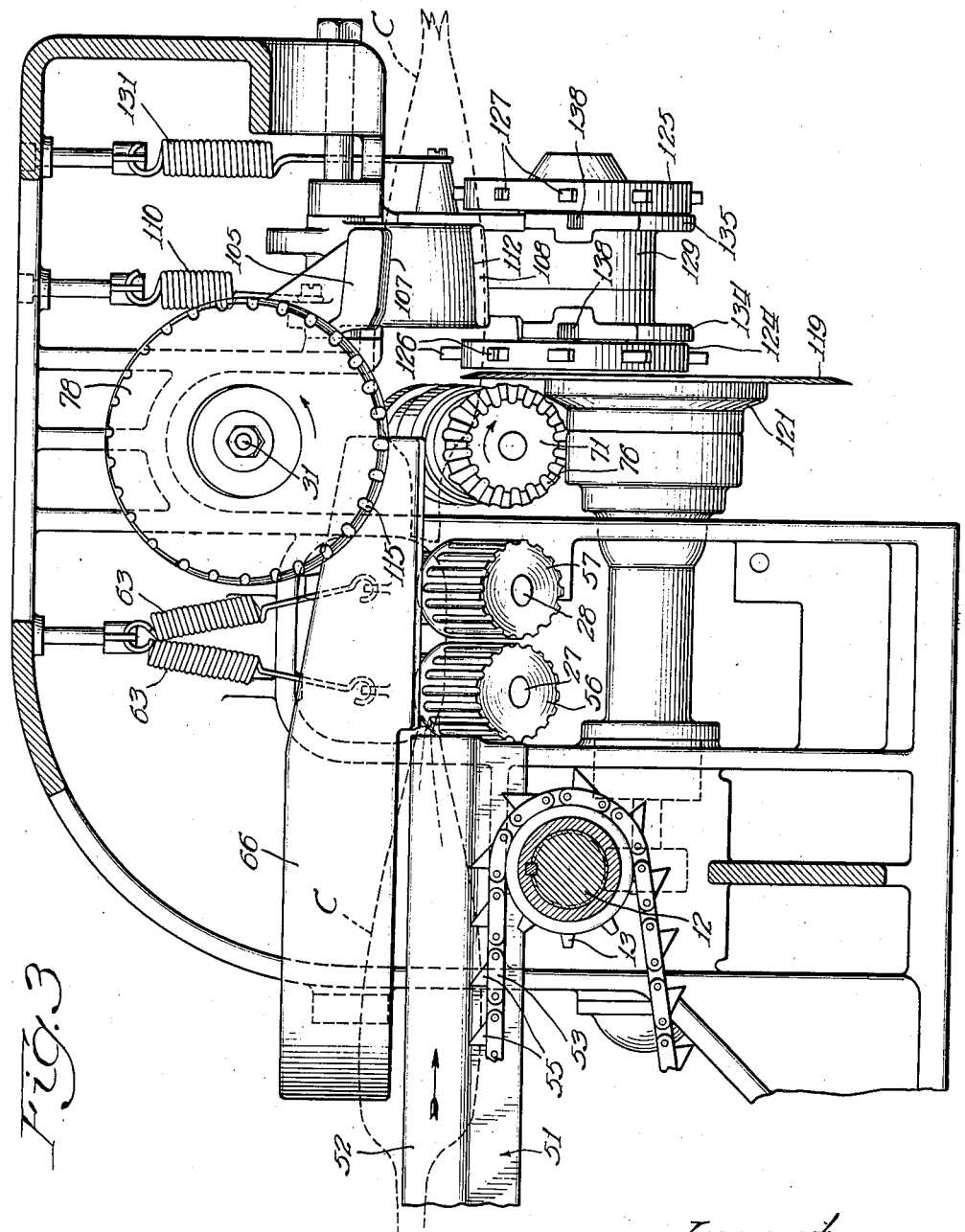

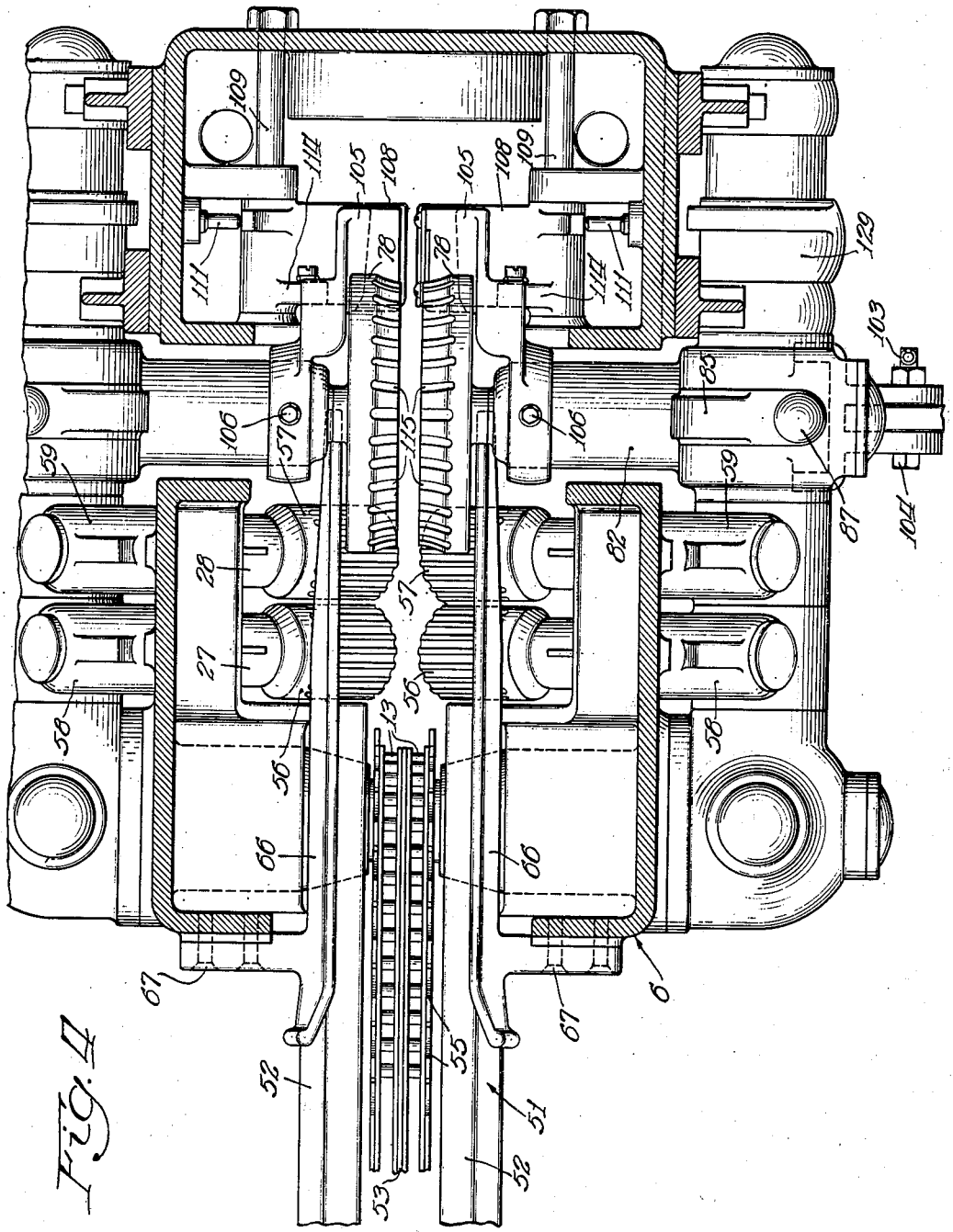

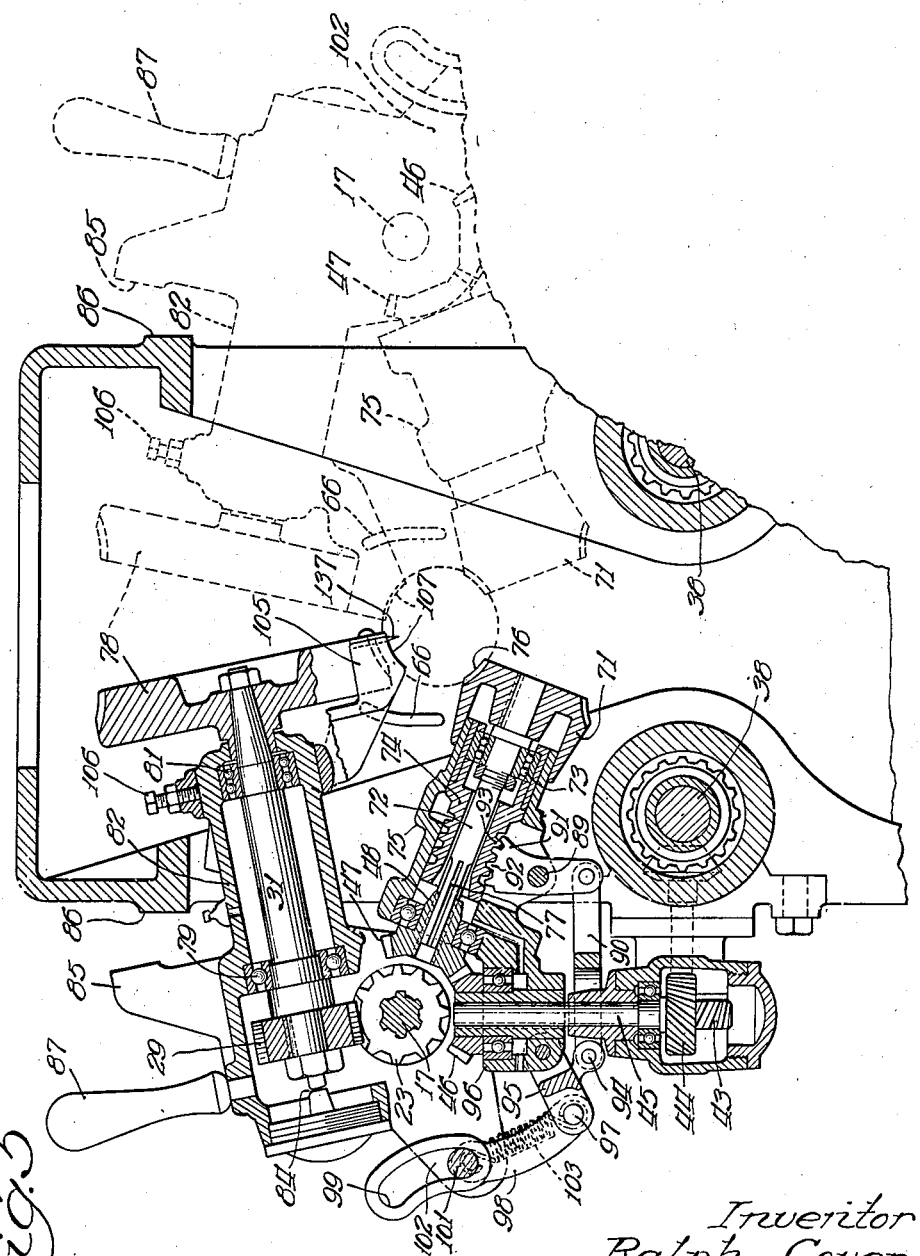

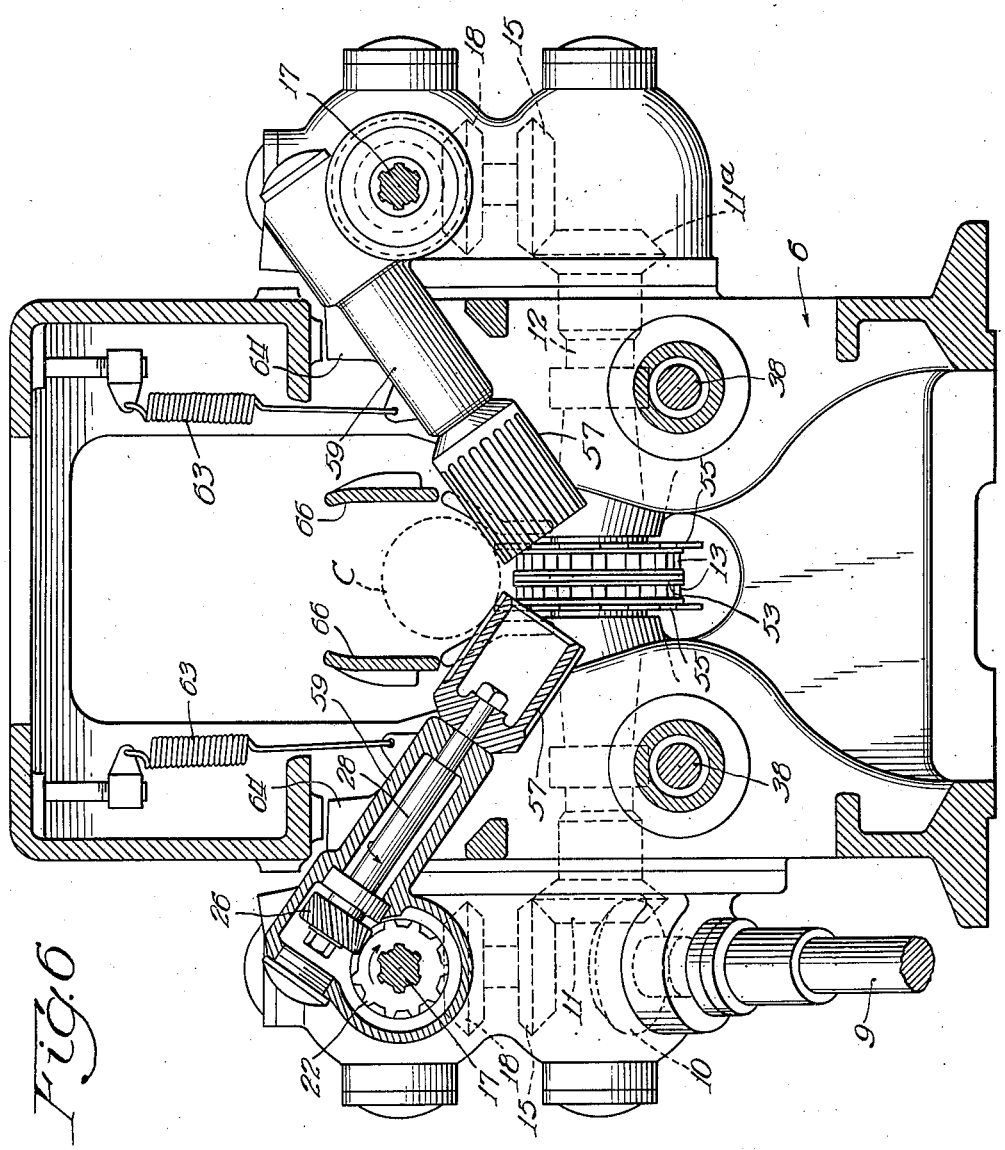

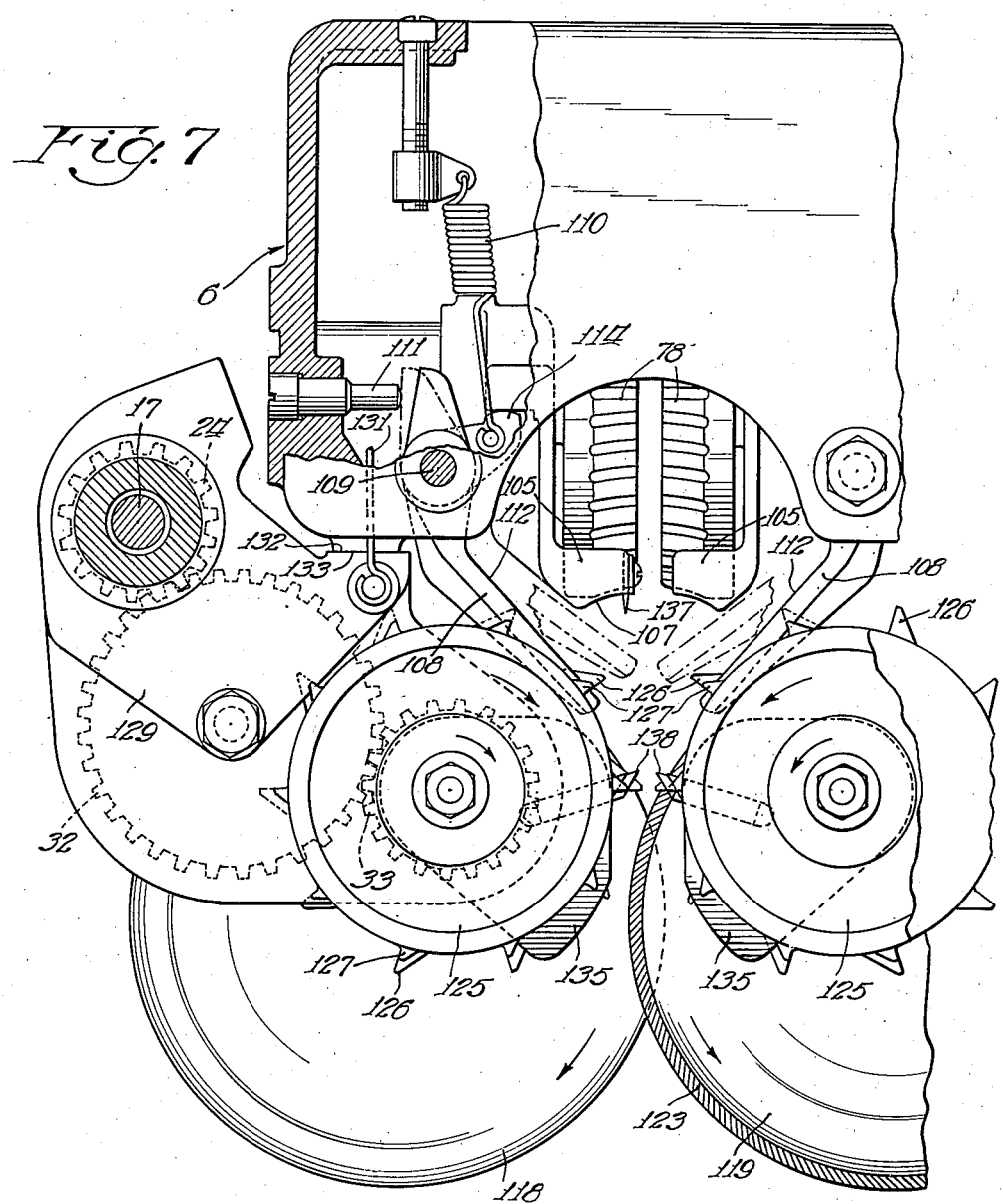

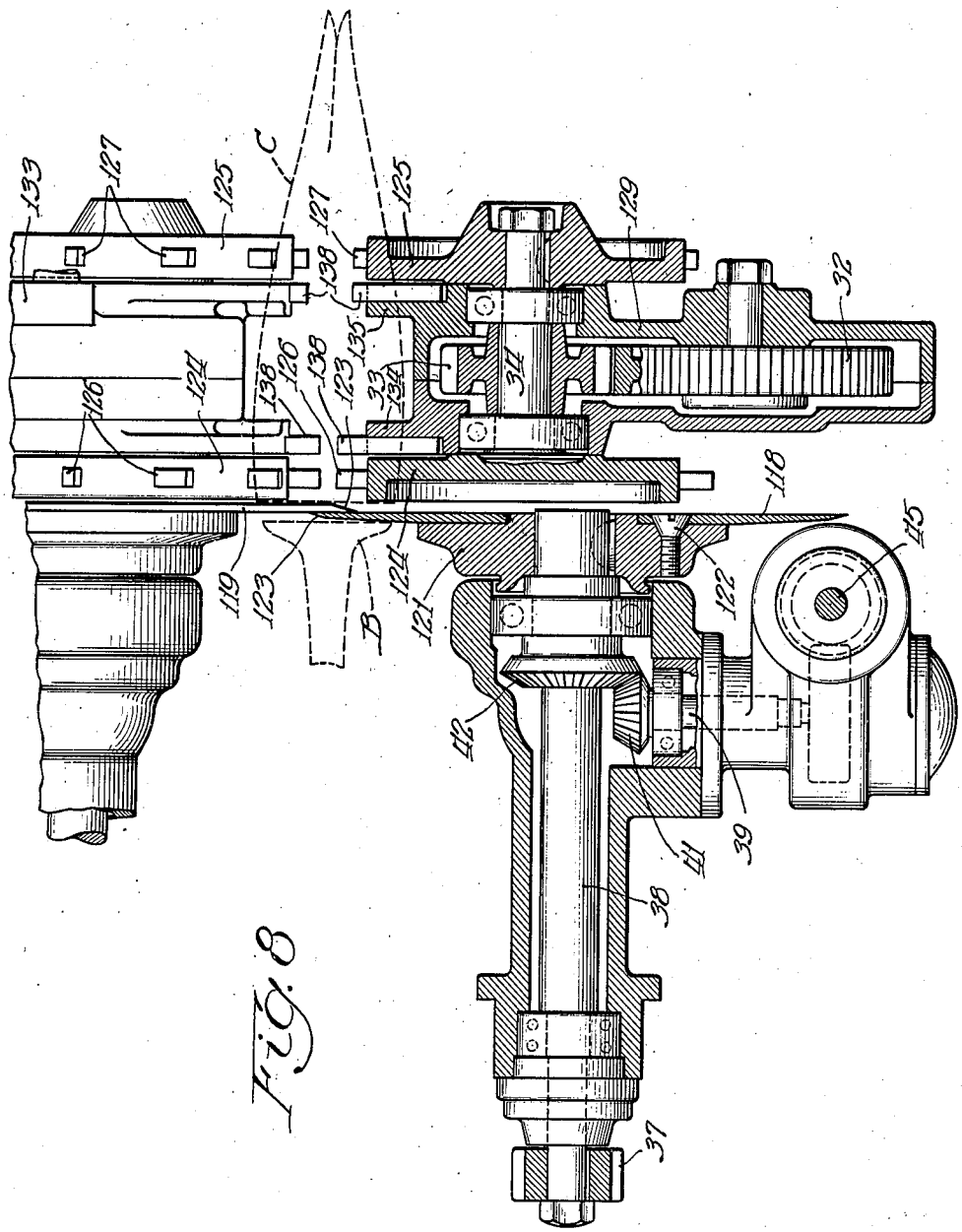

Inventor:
Ralph Cover
By:
Zabel Carlson Fritzbaugh & Wells
Atty.

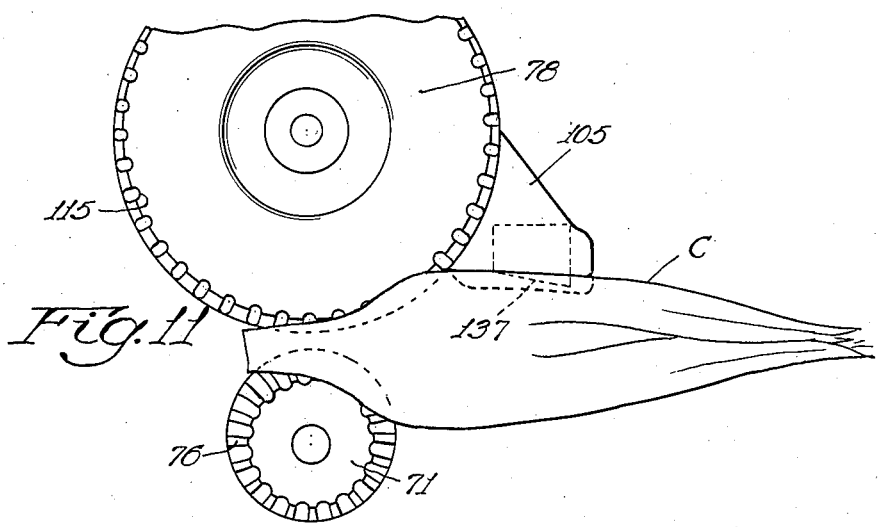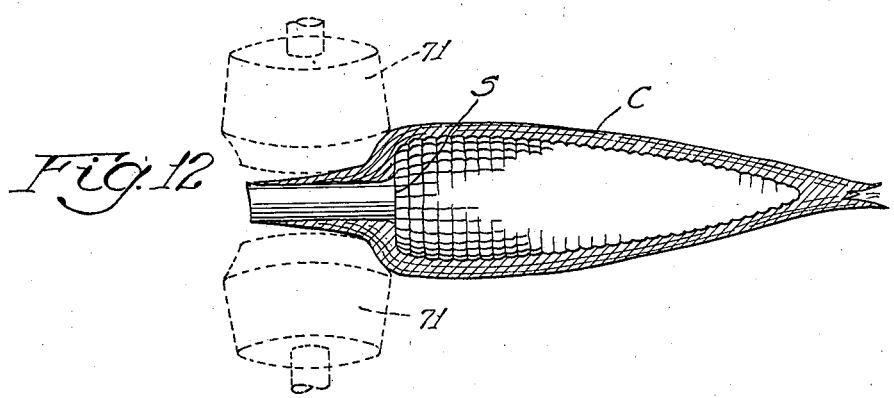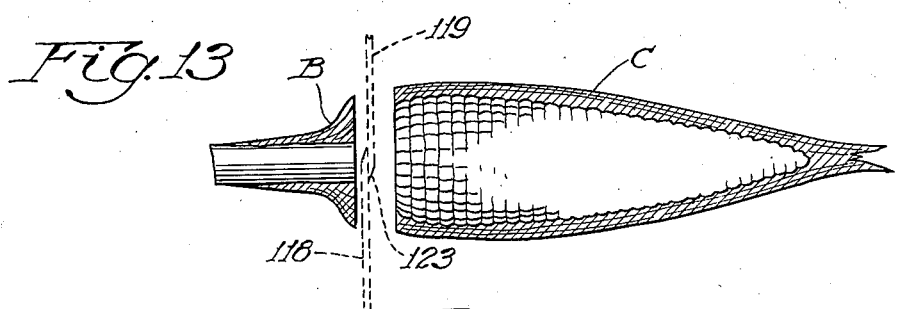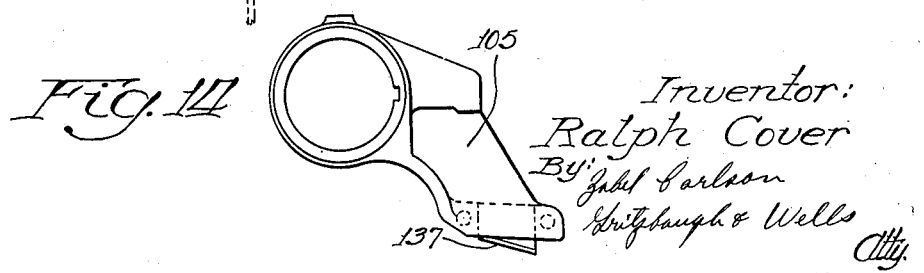

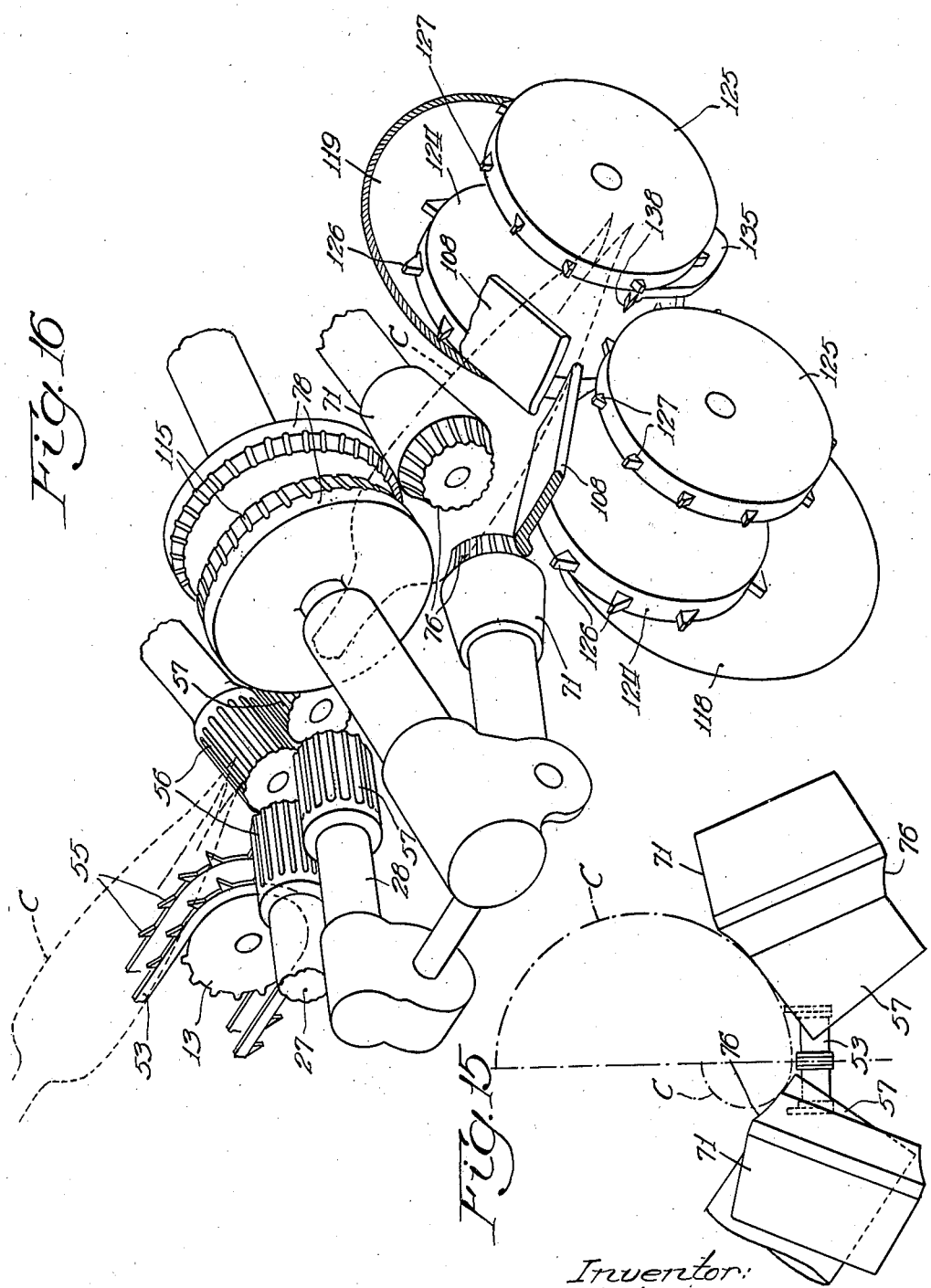

Patented May 13, 1941

2,242,113

UNITED STATES PATENT OFFICE 2,242,113

MACHINE FOR DEBUTTING CORN

Ralph Cover, Westminster, Md.

Application January 22, 1938, Serial No. 186,419

24 Claims. (Cl. 146—84)

The invention relates to novel and useful improvements in machines for debutting ears of corn and in particular green corn after it has been pulled or picked from the stalks.

In order properly to prepare green corn, as received from the grower, prior to cutting or stripping for canning or other similar treatment, it is necessary first that the husk and all portions of the ear upon which the grains are not directly disposed be removed without injury or abuse to the relatively delicate grains. It is well known that such operation may best be carried out by severing the butt end of the ear while its husk is substantially intact at the annular shoulder of the first grain circle, in facilitating the removal of the husk by crushing and ruffling the husk so as to minimize the clinging of the husks to one another and to the grain rows and in thereafter subjecting the ears to husking tumblers or rolls for complete removal of the husks.

Widespread approval and commercial adaption has indicated that the above procedure may be best carried out in machines wherein the ear is caused generally to travel endwise, tip first, through power feed-in devices, through aligning and grain shoulder locating mechanism and thereafter to travel laterally past moving debutting knives prior to delivery of the ears to the husking mechanism. Such machines, in general, are of the type disclosed in U. S. Letters Patent No. 1,561,092.

An object, therefore, of the invention is to provide a machine for debutting ears of corn, and of the general type above described which embodies certain notable improvements over the machine of the aforementioned U. S. Letters Patent, including simplicity of structure, increased speed of operation without grain crushing or bruising, and exact uniformity of operation without regard to size or character of the ear treated.

Another object of the invention is to provide a machine, of the character described, having but two simple adjusting elements for setting and maintaining the machine in readiness for its prescribed requirements and to provide compensation for wear.

A further object is to provide a machine, of the type described, wherein all of the elements of the working mechanism between the feed-in chain and the debutting knives are arranged in pairs, each of the elements of each pair being adapted to engage with, or to work upon, one only of the opposed sides of the ear as it passes through the machine, and each element reacting to self adjustment independently of the other of its pair, thus to compensate for slight irregularities in contour of the ear which might otherwise disturb proper final alignment preparatory for the debutting operation.

A further object is to provide a machine, of the type described, wherein all power operated parts are driven from a single power source, yet each part is caused to function each as to its own work requirement thus to permit complete adaptation of working parts to the particular duty demanded for any size or character of ear.

A further object is to provide a machine, of the type described, wherein the under side of the ear, regardless of its diameter, is caused to travel in a certain, predetermined and fixed course of travel endwise from the feed chain through the several operating parts and to a point where the ear is in its final aligned position, from which point it is caused to descend between the carrier wheels past the debutting process.

Other objects, the advantages and uses of the invention will become apparent after reading the following specification and claims and after consideration of the drawings forming a part of this specification, wherein:

Fig. 1 is a side elevation of a machine embodying the features of my invention with parts thereof broken away;

Fig. 2 is a fragmentary end elevation of the machine illustrated in Fig. 1, as viewed above the husking tumblers and with the parts at rest, the aligning rolls, feed-in rollers and chain not being shown;

Fig. 3 is a sectional view taken along the line 3—3 of Fig. 2, the parts thereof being shown in action;

Fig. 4 is a sectional view taken along the line 4—4 of Fig. 1;

Fig. 5 is a partial sectional view taken along the line 5—5 of Fig. 1;

Fig. 6 is a partial sectional view taken along the line 6—6 of Fig. 1;

Fig. 7 is a fragmentary end elevation view in the direction of the debutting knives with a portion of the head housing broken away, and aligning rolls, feed-in rollers and chain omitted;

Fig. 8 is a sectional view through one of the debutting knife assemblies and cooperating carrier mechanism;

Fig. 10 is a vertical elevation of the feed-in chain drive shaft illustrating the drive gears for the debutting knife shafts;

Fig. 11 is a fragmentary view illustrating one of the complementary sets of presser wheel and aligning roll as these parts appear when the grain shoulder of the ear is being located;

Fig. 12 is a top plan view of the aligning rolls, as positioned in Fig. 11, illustrating the physical relationship between aligning rolls and ear;

Fig. 13 is a view of the ear shown after its descent past the debutting knives;

Fig. 14 is a view illustrating the relative position of the husk slitting knife with respect to its supporting presser plate;

Fig. 15 is a schematic view showing the relationship between the feed-in rolls, the aligning rolls and ears of different diameters during the aligning operation;

Fig. 16 is a purely schematic perspective view of certain essential elements of the machine illustrated in the foregoing figures showing the working parts in their general relationship, one relative to the other.

Figure 9:
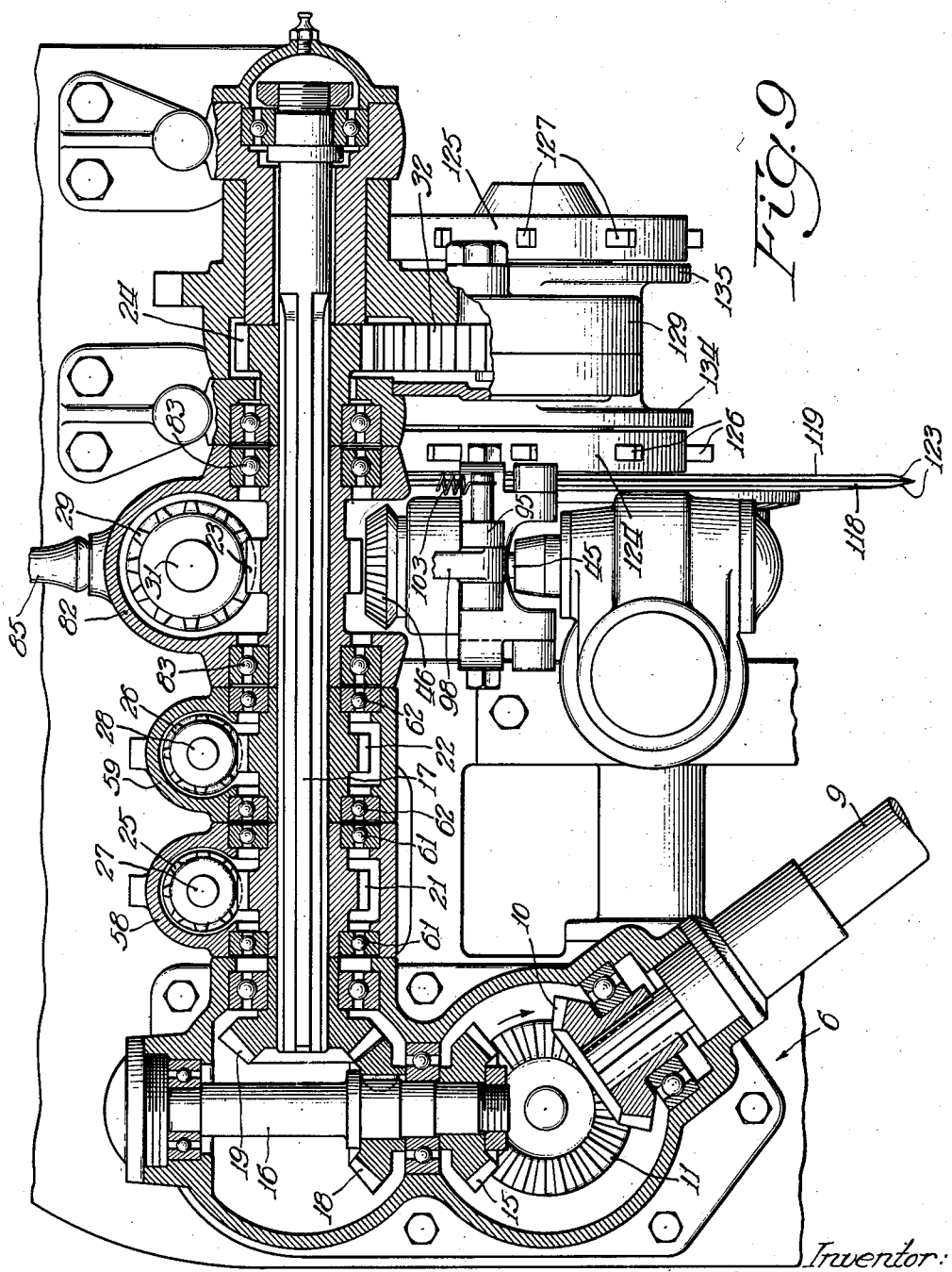
Fig. 9 is a sectional view taken along the line 9—9 of Fig. 2.

In its broader aspects, my invention relates to a machine for debutting ears of corn having a feed-in chain for carrying the ear from a receiving trough into engagement with driven feed-in rollers which act to transfer the ear by endwise movement to aligning devices where the ear of corn passes over aligning rolls and the grain shoulder is brought into engagement with the rolls in such manner as to move the ear transversely in a vertical plane as well as endwise, the shoulder traveling around the working periphery of the rolls to a predetermined horizontal plane where the ear so positioned is delivered to driven carrier wheels for continued downward movement past the debutting knives.

My invention, as to the above phase of operation, contemplates an arrangement of the aligning rolls upon inclined axes which converge inwardly and downwardly in a common vertical plane and wherein the two cooperating rolls are caused to move longitudinally upon their respective axes proportionally to the diameter of the ear treated. The result of such treatment is that each ear regardless of its diameter or length is positioned with its under side in a certain, fixed and predetermined position with respect to the pair of carrier wheels, its final aligned position, at the moment it is delivered to said carrier wheels. This arrangement of the aligner rolls also assures endwise movement of the ears from the feed-in chain to the aligner, each ear with its under side traveling in a fixed horizontal path and in full operative engagement with the machine elements intended to operate thereon without regard to ear size.

The inclined axes of the feed-in rollers and the aligning rolls cooperate in producing a trough-like support for the ear as it travels endwise therealong, so that the movement of the ear is maintained along an axis lying wholly within the central vertical plane of the machine, thus preventing improper treatment resulting from lateral displacement of the ears.

A further and notable feature resulting from the inclined axes of the aligner rolls is the immediate relief of the ear butt portion, and in particular the stalk, after it passes the nearest opposed and adjacent portions of the two driven aligner rolls thereby precluding any possibility of disturbance to ear alignment as the ear is moved to final aligned position and transferred to the carrier wheels.

The invention further, and in its broader aspect, consists in arranging the presser wheels with their presser plates, the aligning rolls, conveyor wheels and retard plates in pairs, the elements of each pair being adapted to move upon independent mountings, thus to compensate for irregularities in the contour of ears which may not be symmetrical as to girth. This feature is of notable importance in connection with the cooperating presser assembly and aligner rolls, each aligner roll being independently adjustable by its corresponding pressure assembly.

*Driving assembly*

With reference to the drawings I have shown the invention as embodied in a machine having a bed 2 upon which may be mounted an electric motor 3. A frame 4 located upon the bed 2 serves as a mounting for the husking tumblers 5 and as a support for the head frame 6 upon which the mechanism of my present invention is carried. A drive chain 7 may be employed to drive the cross shaft for the tumblers 5 upon which there is mounted a bevel gear 8 engageable with a complementary gear (concealed in Fig. 1) carried upon the head drive shaft 9.

Referring now to Figs. 9 and 10 the drive shaft 9 has, at its upper end, a bevel gear 10 meshing with a similar gear 11 carried by the horizontal drive shaft 12 for the feed-in chain drive sprockets 13. A gear 11a identical to the gear 11 is mounted upon the opposite end of the drive shaft 12 and each of the gears 11 and 11a are arranged in mesh with gears 15 carried upon vertical intermediate shafts 16 one located upon each side of the head frame 6 and serving respectively to drive the two horizontal parallel and spaced apart primary drive shafts 17 through cooperating bevel gears 18 and 19.

Carried upon the primary shafts 17 there are helical cut gears 21, 22 and 23 and spur gears 24. Of these gears, 21 and 22 are in mesh respectively with similarly cut pinions 25 and 26 upon the feed-in roll drive shafts 27 and 28, the gears 23 are in mesh with gears 29 on the presser wheel drive shafts 31 and the gears 24 are in mesh with the intermediate gears 32, (see Fig. 8) which gears 32 are in turn in mesh with gears 33 carried by the carrier wheel drive shafts 34.

Referring now to Figs. 5, 8 and 10, the drive shaft 12 carries, between the feed-in chain sprockets 13 and shaft bearings 35, a pair of helical cut gears 36 which mesh with similarly cut gears 37 carried upon horizontal, parallel and spaced apart shafts 38. The shafts 38 comprise the debutting knife drive shafts and are located relative to the operating parts, on the head frame 6, as best indicated in Fig. 6.

Mounted perpendicularly with respect to the shafts 38, and in a horizontal plane, are intermediate shafts 39 having bevel gears 41 at their inner ends in mesh with bevel gears 42 carried upon the adjacent portions of the shafts 38. The intermediate shafts 39 are further provided with helical cut gears 43 at their outwardly directed ends, which mesh, respectively, with similar gears 44 carried by second intermediate and vertically disposed shafts 45. At the upper ends of the shafts 45 are bevel gears 46 which mesh with similar gears 47 carried by the aligner drive stub shafts 48, the latter shafts being mounted upon axes which extend angularly downwardly toward one another in a common vertical plane including the axes of the presser wheel drive shafts 31.

From the foregoing it will be noted that all power operated parts of the machine may be driven from a single power unit and all are possessed of positive drive connections at fixed relative speed ratio although, as will hereinafter appear, each sub-assembly may perform its full and required operation, as to time and amplitude, without regard to similar work phases of the remaining and cooperating sub-assemblies.

*Feed-in assembly*

Referring to Figs. 1, 3, 4 and 6, the feed-in mechanism may comprise a frame 51 mounted upon the head frame 6 and extending generally in a horizontal direction. The frame 51 is formed with spaced apart inner wall surfaces 52 which diverge upwardly, as the walls of a hopper, to provide a receiving table upon which the ears of corn may be dropped for disposition upon the endless feed-in chain 53, which chain is positioned horizontally along the space immediately between the lower edges of the surfaces 52. A pair of idler sprockets 54, rotatably mounted upon the frame 51, carry one end of the chain loop, and the other end thereof being disposed over the driven sprockets 13 upon the cross shaft 12.

The chain 53, as best shown in Figs. 3 and 6, is formed with its outermost links provided with teeth 55 upon which the ears of corn may rest and which prevent relative slippage between chain and ears as the ears are drawn thereupon toward the feed-in rollers 56 and 57.

The feed-in rollers 56 and 57 are arranged in pairs, the rollers 56 being carried on the shafts 27 and the rollers 57 on the shafts 28. The shafts 27 and 28 are rotatably mounted within hollow arms 58 and 59 respectively, each of which is in turn pivotally mounted upon the adjacent shafts 17, through the medium of anti-friction bearings 61 and 62 respectively, as indicated in Fig. 9. Tension springs 63, see Figs. 3 and 6, serve yieldingly to draw the arms 58 and 59 with their corresponding feed-in rollers 56 and 57 upwardly until resisted by stops 64, with the trough formed by the pairs of rollers in operative register with the corn as it travels endwise upon the chain 53.

This yielding mounting for the driven feed-in rollers permits the rollers to be drawn downwardly to pass the stalk of the ear there-through, as when the ears are caused to move in a downward direction, during operation of the aligning mechanism. In addition such mounting of the rollers 56 and 57 may assure continuous passage of ears of all size from the chain to the aligning rolls while maintaining the under side of each ear in a certain, predetermined and fixed horizontal position in which event the springs 63 would yield lightly for ears of longer diameter and the stop 64 serves to set the rollers for exact register with ears of minimum diameter.

As shown in Figs. 4 and 6, guide rails 66 secured to the head frame 6, as shown at 67, may be employed to preclude lateral displacement of the ears during their travel along the inner end of the chain 53, over the rollers 56 and 57 and into engagement with the aligning mechanism.

*Aligning assembly*

The aligning assembly represents the most important single assembly of the present machine and it embodies many of the notable features of my present invention. In my prior Patent 1,560,977, granted November 10, 1925, I have shown an aligning assembly which includes aligning devices and means associated therewith and controlled by the ear for varying the capacity of the aligning means to correspond to the size of the ear being debutted. This enables the aligning devices to find the grain shoulder and align the ear thereby regardless of whether the ear is a small ear or a large ear or of intermediate size. The aligning assembly of this application is an improvement on that of my prior patent. One of the new features resides in the provision of means for raising the aligning devices, when shifted, to accommodate ears of larger size and for returning the aligning devices to initial set position for the small ears of corn after each aligning operation. Another new feature resides in the use of two presser wheels which are mounted for independent movement and are also independently connected to the aligning device with which the presser wheel is associated so that said aligning devices may be moved independently and to different extents, depending upon the shape of the ear. These features and others will be described more in detail hereinafter.

This assembly, as shown in Figs. 3, 4 and 5, comprises aligning rolls 71, fixed upon shafts 72 which in turn are rotatably mounted upon anti-friction bearings 73 carried by sleeves 74 slidably located in the fixed housings 75 upon which the aligner roll drive stud shafts 48 are mounted. As previously described, the axes of the two aligner roll shafts extend angularly downwardly toward one another in a common vertical plane including the axes of the pressure wheel drive shafts 31, and the sleeves 74 may thus move along such angularly extending axes to cause the aligning rolls to move toward and away from one another, and at the same time to vary the position of the work engaging and concave surfaces 76 of the rolls correspondingly toward and away from the central vertical plane of the aligning assembly, as well as downwardly and upwardly. It is this feature of the aligner roll mounting that permits the corn to move with its under side in a certain and predetermined fixed path from the feed-in chain and horizontally over the aligning rolls even though successively treated ears may differ widely as to their diameter. This is clearly illustrated in Fig. 15 where the positions of the operating parts are shown with respect to an ear of small size, at the left side of the figure, and to an ear of large size, at the right side of the figure.

Driving engagement between the stub shafts 48 and roll shafts 72 is maintained by splining the telescoping parts, as indicated at 77, so that free longitudinal movement of the shafts 72 may take place as the sleeves 74 are shifted.

Before describing further the structural and operating characteristics of the aligner rolls it is necessary to note the relationship of the pressure wheels with respect thereto. These wheels 78 of which there are two in number, are independently mounted and driven as are the two aligner rolls 71 each being fixed upon one of the drive shafts 31 (see Fig. 5). The shafts 31 may be supported on anti-friction bearings 79 and 81 carried within housings 82 pivotally mounted, through the medium of anti-friction bearings 83, upon the adjacent shafts 17 (see Fig. 9). End thrust bearings 84 may serve to prevent axial movement of the wheel shafts 31 which might otherwise occur during operation. The presser wheels 78 may thus be swung through an arc in in a vertical plane common to the axes of the aligner rolls 71 as they are caused to do during passage of an ear of corn thereunder in a degree determinable by the diameter of the ear.

Means for limiting downward swinging movement of the presser wheels 78 to a position just sufficient to insure of their engagement by ears of minimum diameter may comprise stop lugs 85 formed on the housings 82 which may engage surfaces 86 formed on the head frame 6. Hand grips 87 may be provided on the housings 82 for manual manipulation of the presser wheel and aligner rolls assemblies.

Referring to Figs. 4 and 5, the aligner shaft housings 75 each have pivotally mounted thereon, at 89, plates 91, formed with teeth 92 in arcuate array and engageable with teeth 93 circumscribing the outer walls of the sleeves 74 in such manner that pivotal movement of the plates 91 results in right line movement of the sleeves 74 with their associated aligner rolls 71. Pivotally connected to the plate 91, on the remote side of their pivotal axes 89, are rigid links 90, which in turn are pivotally connected at 94 to bell-crank elements 95 pivoted upon the portions 96 of the housings 75, on the outer sides of the vertical shafts 45. The elements 95 have, pivotally connected thereto at 97, arms 98 provided with arcuate slotted portions 99 at their outer ends within which cylindrical stops 101 are disposed and eccentrically mounted upon the portions 102 of the housings 82. Tension springs 103 interconnected, the bell cranks 95, on the center 97, and the portions 102 of the housings 82 on the axes of the mountings for the stops 101, thus to maintain the stops 101 yieldingly engaged with the innermost ends of the slotted portion 99 of arms 98. This arrangement operates to cause, through the linkage described, the aligner rolls 71 to move away from the central working axis of the machine as the associated presser wheels 78 are raised and to move toward said axis as the wheels 78 are lowered, although, because of the slotted arms 98 and springs 103, the wheels 78 may move downwardly without accompanying relatively inward movement of the aligner rolls 71. The normal relationship between presser wheel movement and aligner roll movement may be adjusted by the simple expedient of turning the cylindrical stops 101 on their eccentric mountings, as by turning the heads 104 thereof.

Each of the presser wheels 78 has associated therewith a fixed presser plate 105 fixed, as shown at 106 in Figs. 4 and 5, to the adjacent housing 82 and each presenting a work engaging surface 107, see Figs. 3 and 5, extending away from the lower portion of the adjacent presser wheel in the direction of travel of the corn and fashioned to conform substantially to the contour of an ear of corn as it rests in position for delivery to the carrier wheels.

Located beneath the surfaces 107 of the presser plates 105, and for engagement with the under sides of the ears as they pass into position prior to delivery to the carrier wheels, are a pair of retarding plates 108, see Figs. 3 and 7. The retarding plates 108 are pivotally mounted at 109 upon the frame 6 and each is drawn yieldingly upwardly upon its pivotal mounting by adjustably mounted tension springs 110, to positions determinable by adjustable stops 111. In Fig. 7 I have indicated in dotted lines the elevated position of the retarding plates, as when engaging the stops 111. The stops 111 are preferably set so that the under side of the corn may depress the plates slightly against the tension of the springs 110, as it is passed from between the presser wheel and aligner roll assemblies thereby to cooperate with the presser plates 105 in retarding endwise movement of the ear so that it is compelled to follow over and downwardly about the curvature of the spaced aligner rolls, for purposes hereinafter specifically described. As in the case of the surfaces 107 of the presser plates 105, the retarding plates 108 are formed with work engaging surfaces 112 which substantially conform in contour to the ear as it moves to its final aligned position prior to delivery to the carrier wheels. The plates 108 are each provided with arm portions 114 presenting bosses against which the adjacent under side portions of the presser plates 105 may bear, when the presser wheel assemblies move toward their downward limit of travel, thus to urge the retarding plates downwardly against the force of the springs 110 and to facilitate descent of the ear into engagement with the carrier wheels.

With reference to Figs. 3 and 16, the concave work engaging surfaces of the aligner rolls 71 are preferably transversely grooved, as are the similar concave surfaces 115 of the presser wheels 78, in order to assure non-slipping engagement with the ear. In like manner the feed-in rolls 56 and 57 may be formed with transverse grooves on the outer surfaces thereof to assure efficiency in the feeding of the ears to the aligning assembly.

Cutting assembly

The cutting assembly includes a pair of circular cutting knives 118 and 119 fixed upon hub members 121, as by screws 122, which in turn are mounted upon the shafts 38 to turn therewith as shown in Fig. 8 and cooperating pairs of driven carrier wheels between which the corn is engaged and carried downwardly past the cutting knives.

The cutting knives 118 and 119 are arranged with their cutting edges overlapping at a point directly beneath the central axis of the ear, at the shoulder thereof, when in its final aligned position. As indicated in Fig. 7 the outwardly directed face of each of the knives, on its ground cutting edge, is serrated as shown at 123. Direction of rotation of the knives is toward one another with respect to the descending ears.

The carrier wheels may comprise two pairs of wheels 124 and 125 respectively, the wheels 124 being mounted upon that end of each of the shafts 34 adjacent to the cutting knives and the wheels 125 being mounted upon the opposite ends of the shafts 34. The wheels 124 are formed with radially extending grip teeth 126 at the midportions of their peripheries and the wheels 125 with similar teeth 127 but of lesser height. Both sets of teeth 126 and 127 are inclined slightly in the direction of rotation of the wheels thus to provide positive grip on the ears as they contact therewith. The spacing of the carrier wheels relative to the length of the shafts 34 and to the cutting knives is such that the ears are gripped at points spaced apart intermediate their lengths and forwardly of the butt section but sufficiently close thereto that the ears may be firmly held against displacement during the actual debutting process.

Each of the driving gear trains for the carrier wheel driven shafts 34 previously described is contained within a housing 129 which, in turn, are pivotally mounted about the centers of the primary shafts 17, and each housing 129 is drawn yieldingly upwardly by tension springs 131 until resisted by engagement between the stop surfaces 132 and 133 of the housing and head frame 6 respectively, as shown in Fig. 7. This arrangement results in holding the pair of carrier wheels in immediate position for engagement with the ear as it moves over and about the align rolls 71 to its final aligned position, at which time the carrier wheels, by their tooth portions, function to grip the ear and to carry it downwardly past the cutting knives thereby to sever the butt. The provision of the pivotal mounting for the carrier wheel assemblies and springs 131 serves to urge the opposed carrier wheels of each pair toward one another and hence toward the ear so that no matter what diameter ear is aligned for debutting, the wheels may grip it with uniformness and carry it downwardly past the driven knives.

In order to facilitate removal of the ears from engagement by the teeth upon the conveyor wheels after the butt has been severed, the housing 129 is provided with flanges 134 and 135 which extend radially beyond the teeth 126 and 127 respectively below the center lines of the conveyor wheels as best shown in Figs. 7 and 8.

Husk slitting and ruffling elements

Secured to one of the presser plates 105, and extending outwardly from its work engaging surface 107, is a slitting knife 137, as shown in Fig. 5, so arranged that as the ear is moved endwise under the presser plate, just prior to its movement into final aligned position, the husk will be slit longitudinally for a portion of its length. Inasmuch as the knife 137 is fixed relative to the movable presser assembly, the depth of penetration of the knife edge through the husk will be uniform, regardless of ear size, and hence may be adjusted so as not to cut into the grain rows of the corn. This slitting of the husk enables the preliminary step of the husking process to become more efficient as carried out by the ruffling elements.

The ruffling elements comprise relatively stationary and sharply pointed fingers 138 fixed in the flange portions 134 and 135 of the housings 129. These fingers 138, see Fig. 7, are pointed and inclined upwardly at about the central horizontal plane of the carrier wheel assemblies and serve as the ear is carried downwardly between the wheels during the operation of the cutting knives to engage with and tear away or loosen the husk which previously has been subjected to slitting by the knife 137. When the ear has been delivered from the carrier wheels and permitted to fall downwardly toward the husking tumblers 5, it will have its husk partially free from the grain rows and in proper condition for complete husking under action of the tumblers 5. This slitting and ruffling mechanism referred to above is shown, described and claimed in my divisional application, Serial No. 370,704, filed December 18, 1940.

It will be noted, see Fig. 1, that while the ears are caused to fall downwardly in the same position occupied during their travel between the carrier wheels, that there is disposed upon the bed frame 4 at the head of the tumblers 5, a guide platform 141 presenting an inclined upwardly directed surface beneath the falling ears. The inclined surface of the platform acts to cause each ear to strike, butted end first and to rebound so that the ear strikes the tumblers tip first. In striking tip first, the ear is thus best presented to the action of the rolls for husking, including the removal of its silk.

Operation

In operation, the debutting machine, constructed as herein described, may be fed by placing the green corn as it is received from the grower directly upon the feed-in chain 53 which act is facilitated by the diverging hopper-like side walls 52 of the assembly 51. It is only necessary that the ears be placed with the tip pointed toward the head frame 6. Any overlapping of the ears, should this occur, will not result in jamming of the ears at the head mechanism because of the increased speed of the feed-in rollers 56 and 57 over that of the speed of travel of the chain 53. The side rails 66 function during the feed-in operation to laterally align each ear properly upon its axis of travel up to the point where it is engaged by the aligner roll and presser assemblies.

In the event the ear is of minimum diameter the yieldingly mounted feed-in rollers 56 and 57 will remain in their normal position, but where the ear is of larger diameter the rollers will yield slightly in a downward direction after initial engagement thereof by the presser and aligner assemblies so that, without regard to ear diameter, there may always be full engagement between the rollers and the bottom side of the ear and hence proper conduct of the ear through the aligning mechanism, note Fig. 15, in the manner hereinafter described.

Once the ear has been engaged by the cooperating presser wheels 78 and aligner rolls 71, the presser wheels 78 will be elevated by virtually "riding up" upon the ear an amount determinable by the diameter of the ear at that portion of its length immediately in register therewith. Movement of the presser wheels 78 upwardly through their pivotal mountings 83, will, through the linkage 98, 95, 90, 91, 74, cause the shafts 72 with their aligner rolls 71 to be drawn upwardly and outwardly thus causing corresponding movement of the ear supporting surfaces 76 of the aligner rolls upon which the under side portions of the ear rests. The result of such operation of the parts is to cause the under side of the ear to lie in a certain and predetermined fixed horizontal position, without regard to the diameter of the ear and further without regard to slight irregularities in girth contour, one side relative to the other. This latter advantage is gained because of the fact that each presser wheel acts independently of the other, and each therefore controls its own aligner roll 71.

A further and important advantage attributal to the independently mounted presser wheels 78 is that, with an increase in diameter of the corn treated, the points of contact between presser wheels and aligner rolls, severally, spread further apart from one another thus more evenly to distribute engagement between the contacting parts of the mechanism and the side wall of the ear. This procedure results in the accurate maintenance of the ear in its prescribed course of travel with its under side in the aforementioned fixed course of travel.

The importance of carrying the ear through a certain and fixed course of travel will be readily apparent after consideration of the carrier mechanism which transfers the ears from their final aligned portion directly to the cutting knives, the operation of which is described in detail in a following portion of this specification.

As the ears are moved between the driven presser wheels 78 and aligner rolls 71, the forward portion of the ear next engages the surfaces 107 and 112 of the presser plates 105 and retarding plates 108, the retarding plates yielding downwardly and acting under the influence of the springs 110 in such manner that endwise movement of the ear is resisted and the shoulder of the ear thus caused to travel about the aligner rolls, as shown in Figs. 11 and 12. The weight of the presser assembly, including the presser wheels and plates, serve at this time to keep the shoulder of the ear in firm contact with the aligner rolls 71 so that husk, about the grain shoulder of the ear, is slightly crushed to enable the ear portion at the grain shoulder to travel close to the contacting portion of the aligner rolls thus automatically "locating" the grain shoulder for the final aligned position of the ear.

As the ear, with its portion at the grain shoulder bearing upon the adjusted aligner rolls 71, travels about the rolls, it will gradually move downwardly lowering the presser assembly, although at this time the aligner rolls 71 will not move inwardly because of the lost motion connection, in the linkage between the presser assembly and aligner assembly including the slotted arm 98, until the ear is in its final aligned position with the grain shoulder in vertical register with the cutting knives 118 and 119.

When the ear arrives at its said final aligned position, it is engaged by the teeth 126 and 127 of the carrier wheels in such manner that the ear is carried vertically downwardly, its butt through the cutting knives by which the butt is severed, see Fig. 13, from the grain bearing portion of the ear, and in each event, exactly at the grain shoulder. During such travel of the ear the springs 131 will yield to permit the pairs of carrier wheels to move apart an amount determinable by the size of the ear, so that firm engagement between the carrier wheels and the ear at spaced points intermediate the length of the ear is maintained.

It will be noted, see Figs. 7 and 16, that the teeth 126 and 127 on the carrier wheels 124 and 125 respectively are spaced apart from one another about the peripheries of the carrier wheels and that they are likewise spaced from the edges of the wheel peripheries. Such an arrangement provides relatively sizable areas or "lands" adjacent the inner ends of the teeth which serve to limit the depth of bite of the teeth into the husk portion of the ears during the ear carrying operation, thus to preclude injury to the grains by piercing, as might readily occur in the event such "lands" were not provided.

The ear, during its passage from its final aligned position through the cutting knives, will cause the retarding plates 108 to be moved downwardly, against the action of the springs 110, as such travel progress, or in the event a small ear being so carried such downward movement of the retarding plates will be aided by contact between the presser plates 105 and the bosses 114 as the retarding plate assemblies.

In the event the butt of the ear has a stalk portion of sizeable dimension, the adjacent feed-in rollers 57, or both sets of rollers 56 and 57, may be urged downwardly by engagement of the stalk therewith to permit its passage as the ear is carried downwardly by the carrier wheels. With reference to Fig. 5 it will also be noted that the angular relationship of the axes of the aligner rolls 71 is such that once the stalk portion of the butt has passed between the upper portions of the aligner rolls the stalk is immediately relieved from any possible retarding contact with the end surfaces of the rolls, a condition which does not exist where the aligner rolls are located on a common axis as heretofore proposed.

During the aligning of the ear, and while it is moving in contact with and relative to the presser plates 105, the slitting knife 137, see Fig. 14, will function to slit a portion of the husk longitudinally of the ear, but only for a depth definitely determined without regard to ear diameters by the extent to which the knife protrudes downwardly beyond the surface 107 of the presser plate upon which it is mounted. The husk of the ear being slit as described is therefore prepared for more efficient treatment by the ruffler elements 138 of which those on the carrier support flange 134 are longer than those on the flange 135.

The ruffler elements 138, which remain relatively stationary as the ear is carried downwardly by the carrier wheels, act to bite into the husk thus to tear the husk away from the grain rows and in general to render the husk susceptible to ready removal by the husking tumblers 5. Disengagement of the husk from possible entanglement upon the relatively sharp carrier wheel teeth 126 and 127 is facilitated by the contour of the carrier assembly housing flanges 134 and 135, as best illustrated in Fig. 7, so that the ear may be dropped, while in a horizontal position, as last carried by the wheels 124 and 125 directly upon the inclined surface 141 where the butt end striking first may cause the ear to move with its tip first engaging with the tumbler rolls 5. This latter movement of the ears is clearly indicated in dotted lines in Fig. 1.

It will be apparent from the foregoing that a machine constructed in accordance with my invention, subjects each ear of corn treated therein to identical debutting procedure, with each ear no matter what its length or diameter may be, nor however it may vary as to girth contour moved to the same certain and predetermined final aligned portion so that in each event the butt will be severed squarely and at a point immediately rearward of the grain shoulder.

It will also be apparent that the machine by virtue of its construction and the arrangement of its parts is unusually compact. The housings enclosing all of the driving gear trains and the assemblies upon the primary shafts 17 are all so designed as to facilitate lubrication by simple operation and in conventional manner. Ball bearings have been indicated as providing efficient anti-friction mountings for moving parts, although of course such bearings may be replaced, in manufacture, for any other desirable bearing means as particular requirements may dictate. This feature is in part attributable to the compact assemblies upon the primary shafts 17 and to the use of rotating carrier wheels in place of the more cumbersome carrier chains of previous debutting machines, the use of which is made possible largely because of my improved aligning means as herein described.

It will be understood that while I have illustrated but one particular embodiment of my invention, in the form of a complete debutting machine, that such embodiment may be varied greatly, as to design, without departing from within the spirit and scope of my invention as set forth in the appended claims.

I claim:

1. A corn debutting machine including in combination cutting means, opposed spaced aligning devices for positioning the ears for debutting, means for supporting said aligning devices for independent movement, means for supporting and feeding ears one after another in an endwise direction to the aligning devices, and an independently movable presser device connected with each aligning device and contacting with the ear for automatically shifting the aligning device associated therewith an extent determined by the size and contour of the portion of the ear contacted with by said device.

2. A corn debutting machine including in combination cutting means, opposed spaced aligning devices for positioning the ears for debutting, means for supporting said aligning devices for independent movement, means for supporting and feeding ears one after another in an endwise direction to the aligning devices, and independently movable presser devices connected to the respective aligning devices and contacting with the ear for automatically shifting the aligning device associated therewith an extent determined by the size and contour of the portion of the ear contacted with by said device.

3. A corn debutting machine including in combination cutting means, opposed spaced aligning devices for positioning the ears for debutting, means for supporting said aligning devices for independent movement, means for supporting and feeding ears one after another in an endwise direction to the aligning devices, and independently movable presser devices connected to the respective aligning devices and contacting with the ear for automatically shifting the aligning device associated therewith an extent determined by the size and contour of the portion of the ear contacted with by said device, the connecting means between each presser device and its associated aligning device including a lost motion whereby the presser devices may move downwardly independent of any shifting movement of the aligning devices.

4. A corn debutting machine including in combination cutting means, opposed spaced rotating aligning devices, means for supporting said aligning devices for independent movement, means for causing the butt of the ear to engage said aligning devices whereby the ear is positioned thereby for the cutting means, and an independently movable device connected with each rotating aligning device and contacting with the ear for automatically shifting the aligning device associated therewith an extent determined by the size and contour of the portion of the ear contacted with by said device.

5. A corn debutting machine including in combination cutting means, opposed spaced rotating aligning devices, means for supporting the aligning devices for independent movement toward and from each other, means for feeding the ear endwise and point first along the aligning devices, retarding devices for holding the grain shoulder of the ear against the aligning devices, a presser wheel associated with each aligning device and engaging the body of the ear, and a connecting means between the presser wheel and the aligning device associated therewith whereby said aligning devices are independently shifted through contact of the presser wheels with the body of the ear for varying the capacity of the aligning devices to correspond to the size and contour of the ear to be debutted.

6. A corn debutting machine including in combination cutting means, spaced aligning devices rotating about inclined axes diverging outwardly from the path of travel of the ear, means for supporting said aligning devices whereby they may be shifted longitudinally of their axes, means for supporting and feeding the ears one after another endwise along the aligning devices, means for causing the butt of the ear to engage said aligning devices whereby the ear is positioned thereby for cutting, and devices operated upon by the ear for shifting the aligning devices along their respective inclined axes for varying the capacity of the aligning devices to correspond to the ear to be debutted.

7. A corn debutting machine including in combination cutting means, spaced aligning devices rotating about inclined axes diverging outwardly from the path of travel of the ear, means for supporting and feeding the ears one after another endwise along the aligning devices, means for causing the butt of the ear to engage said aligning devices whereby the ear is positioned thereby for cutting, and an independently movable presser device associated with each aligning device and connected thereto so as to shift the aligning devices along their axes independently for positioning the same to correspond to the size and condition of the ear to be debutted.

8. A corn debutting machine including in combination cutting means, spaced rotating aligning devices, means causing the butt of the ear to engage the aligning devices whereby the ear is positioned thereby for the cutting means, said aligning devices being mounted for rotation about axes diverging outwardly from the path of travel of the ear, the adjacent faces of the aligning devices lying in planes diverging away from each other in the direction of travel of the ear during the debutting operation whereby the ear and butt are released for free sidewise movement as soon as it is properly aligned relative to the cutting means.

9. A corn debutting machine including in combination cutting means, spaced rotating aligning devices, means causing the butt of the ear to engage the aligning devices whereby the ear is positioned thereby for the cutting means, said aligning devices being mounted for rotation about axes diverging outwardly from the path of travel of the ear, the adjacent faces of the aligning devices lying in planes inclining outwardly whereby the ear is released for free sidewise movement as soon as it is properly aligned relative to the cutting means, and a presser device associated with each aligning device and connected thereto for moving its associated aligning device axially to correspond to the size and condition of the ear to be debutted.

10. A corn debutting machine including in combination cutting means, spaced aligning devices rotating about axes diverging outwardly and upwardly, each aligning device including a housing, a rotatable member mounted therein, a sleeve connected to said rotatable member for rotation thereby and endwise movement thereon, said sleeve being connected to and supporting the aligning device, and a presser wheel associated with each aligning device and connected to said sleeve so as to shift the sleeve longitudinally of the axis of rotation to correspond to the size and condition of the ear to be debutted.

11. A corn debutting machine including in combination cutting means, spaced aligning devices rotating about axes diverging outwardly and upwardly, each aligning device including a housing, a rotatable member mounted therein, a sleeve connected to said rotatable member for rotation thereby and endwise movement thereon, said sleeve being connected to and supporting the aligning device, and a presser wheel associated with each aligning device and connected to said sleeve so as to shift the sleeve longitudinally of the axis of rotation to correspond to the size and condition of the ear to be debutted, said connecting means including a lost motion permitting a downward movement of the presser wheel independently of the shifting movement imparted to the aligning device.

12. A corn debutting machine including in combination, cutting means, spaced aligning devices rotating about inclined axes diverging outwardly from the path of travel of the ear, means for supporting and feeding ears one after another endwise along the aligning devices, means for causing the butt of the ear to engage said aligning devices whereby the ear is positioned for cutting, and a movable presser means connected to the aligning devices for shifting said devices along their axes for positioning the aligning devices to correspond to the size of the ear to be debutted.

13. A corn debutting machine including in combination, cutting means, spaced aligning devices rotating about inclined axes diverging outwardly from the path of travel of the ear, means for supporting and feeding ears one after another endwise along the aligning devices, means for causing the butt of the ear to engage said aligning devices whereby the ear is positioned for cutting, and a rotatable presser means connected with the aligning devices so as to shift said aligning devices along their axes for positioning the same to correspond to the size of the ear to be debutted.

14. A corn debutting machine including in combination cutting means, spaced independently movable aligning devices for positioning the ears for debutting, means for supporting said aligning devices for movement toward and from each other, means for supporting and feeding ears one after another in an endwise direction tip first to the aligning devices, and an independently movable presser device connected with each aligning device for shifting the same to correspond to the size and contour of the ear to be debutted.

15. A corn debutting machine including in combination, cutting means, spaced aligning devices rotating about inclined axes diverging outwardly from the path of travel of the ear, means for supporting and feeding ears one after another endwise tip first along the aligning devices, means for causing the butt of the ear to engage said aligning devices whereby the ear is positioned for cutting, and a movable presser means connected to the aligning devices for shifting said devices along their axes for positioning the aligning devices to correspond to the size of the ear to be debutted.

16. A corn debutting machine including in combination cutting means, opposed spaced aligning devices, means for supporting said aligning devices for movement toward and from each other for positioning the ear for debutting, means for supporting and feeding ears one after another in an endwise direction to the aligning devices, control means associated with the aligning devices and contacting with the ear for separating the aligning devices an extent determined by the size and contour of the ear, and means for causing the aligning devices when separating from each other to accommodate ears of larger size to move upward from the initial set position thereof, said aligning devices returning to initial set position after each aligning operation.

17. A corn debutting machine including in combination cutting means, opposed spaced aligning devices, means for supporting said aligning devices for movement toward and from each other for positioning the ear for debutting, means for supporting and feeding ears one after another in an endwise direction to the aligning devices, means for feeding the ear sidewise from the aligning devices to the cutting means for debutting the ear, control means associated with the aligning devices and contacting with the ear for separating the aligning devices an extent determined by the size and contour of the ear, and means for causing the aligning devices when separating from each other to accommodate ears of larger size to move upward from the initial set position thereof, said aligning devices returning to initial set position after each aligning operation.

18. A corn debutting machine including in combination cutting means, opposed spaced aligning devices, means for supporting said aligning devices for movement toward and from each other for positioning the ear for debutting, means for supporting and feeding ears one after another in an endwise direction to the aligning devices, control means associated with the aligning devices and contacting with the ear for separating the aligning devices an extent determined by the size and contour of the ear, and means for causing the aligning devices when separating from each other to accommodate ears of larger size to move upward from the initial set position thereof, said aligning devices being initially set for debutting small ears of corn, said aligning devices returning to initial set position after each aligning operation.

19. A corn debutting machine including in combination cutting means, opposed spaced aligning devices, means for supporting said aligning devices for movement toward and from each other for positioning the ear for debutting, means for supporting and feeding the ears one after another, tip-first, in an endwise direction to the aligning devices, means for feeding the ears sidewise from the aligning devices to the cutting means for debutting, means for causing the butt of the ear to engage the aligning devices whereby the ear is positioned thereby for debutting, control means associated with the aligning devices and contacting with the ear for separating the aligning devices an extent determined by the size of the ear, and means for causing the aligning devices when separating from each other to accommodate ears of larger size to move upward from the initial set position thereof, said aligning devices returning to initial set position after each aligning operation.

20. A corn debutting machine including in combination cutting means, opposed spaced aligning devices, means for supporting said aligning devices for independent movement toward and from each other for positioning the ear for debutting, means for supporting and feeding ears one after another in an endwise direction to the aligning devices, an independently movable presser device connected with each aligning device and contacting with the ear for separating the aligning devices an extent determined by the size and contour of the ear, and means for causing the aligning devices when separating from each other to accommodate ears of larger size to move upward from the initial set position thereof, said aligning devices returning to initial set position after each aligning operation.

21. A corn debutting machine including in combination cutting means, opposed spaced aligning devices, means for supporting said aligning devices for independent movement toward and from each other for positioning the ear for debutting, means for supporting and feeding the ears one after another, tip-first, in an endwise direction to the aligning devices, means for feeding the ears sidewise from the aligning devices to the cutting means for debutting, means for causing the butt of the ear to engage the aligning devices whereby the ear is positioned thereby for debutting, an independently movable presser device connected with each aligning device and contacting with the ear for separating the aligning devices an extent determined by the size and contour of the ear, and means for causing the aligning devices when separating from each other to accommodate ears of larger size to move upward from the initial set position thereof, said aligning devices returning to initial set position after each aligning operation.

22. A corn debutting machine including in combination cutting means, opposed spaced aligning devices for positioning the ear for debutting, means for supporting said aligning devices for independent movement toward and from each other, means for supporting and feeding ears one after another in an endwise direction to the aligning devices, and independently movable presser devices contacting with the ear and connected with the aligning devices for automatically shifting the same independently of each other in accordance with the contour of the ear.

23. A corn debutting machine including in combination cutting means, opposed spaced aligning devices for positioning the ear for debutting, means for supporting said aligning devices for independent movement toward and from each other, means for supporting and feeding ears one after another in an endwise direction and tip first to the aligning devices, and independently movable presser devices contacting with the ear and connected with the aligning devices for automatically shifting the aligning devices independently of each other in accordance with the contour of the ear.

24. A corn debutting machine including in combination cutting means, opposed spaced aligning devices for positioning the ear for debutting, means for supporting said aligning devices for movement relative to the center line of the ear, means for supporting and feeding ears one after another in an endwise direction to the aligning devices, and independently movable presser devices contacting with the ear and connected with the aligning devices for automatically shifting the aligning devices different distances relative to the center line of the ear determined by the contour of the ear whereby said aligning devices may be automatically shifted different distances relative to the center line of the ear.

RALPH COVER.